(12) United States Patent
Takagi et al.

(10) Patent No.: US 12,221,562 B2
(45) Date of Patent: Feb. 11, 2025

(54) ADHESIVE SHEET

(71) Applicant: 3M INNOVATIVE PROPERTIES COMPANY, St. Paul, MN (US)

(72) Inventors: Shuji Takagi, Tokyo (JP); Koji Tsuda, Sagamihara (JP); Pradip K. Bandyopadhyay, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 753 days.

(21) Appl. No.: 17/056,453

(22) PCT Filed: May 22, 2019

(86) PCT No.: PCT/US2019/033597
§ 371 (c)(1),
(2) Date: Nov. 18, 2020

(87) PCT Pub. No.: WO2019/226819
PCT Pub. Date: Nov. 28, 2019

(65) Prior Publication Data
US 2021/0207010 A1    Jul. 8, 2021

(30) Foreign Application Priority Data
May 23, 2018 (JP) ................................ 2018-098572

(51) Int. Cl.
*C09J 163/04* (2006.01)
*C09J 7/25* (2018.01)
(Continued)

(52) U.S. Cl.
CPC ............. *C09J 163/04* (2013.01); *C09J 7/255* (2018.01); *C09J 7/26* (2018.01); *C09J 7/35* (2018.01);
(Continued)

(58) Field of Classification Search
None
See application file for complete search history.

(56) References Cited

U.S. PATENT DOCUMENTS

| 10,113,087 B2 | 10/2018 | Ueki |
| 2014/0134905 A1 | 5/2014 | Quaderer |

(Continued)

FOREIGN PATENT DOCUMENTS

| EP | 3284793 | 2/2018 |
| JP | 2011-244596 | 1/2011 |

(Continued)

OTHER PUBLICATIONS

International Search Report for PCT International Application No. PCT/US2019/033597, mailed on Aug. 20, 2019, 5 pages.

*Primary Examiner* — Shawn Mckinnon
(74) *Attorney, Agent, or Firm* — Gregg H. Rosenblatt

(57) ABSTRACT

[Problem] To provide a thermally expandable adhesive sheet which is tack-free in the state prior to use and exhibits high workability using a different means than that of related art. [Solution] The present invention provides a thermally expandable adhesive sheet (1) including: a substrate (3); two thermally expandable adhesive layers (5) each provided on either side of the substrate; and two adhesive permeable layers (7) each provided on a surface of the two adhesive layers, the adhesive permeable layers being permeable to the adhesive at the time of the thermal expansion of the adhesive. By heating the adhesive sheet, it is possible to expand the adhesive sheet while simultaneously allowing the adhesive to emerge on the outermost surface of the adhesive sheet.

15 Claims, 1 Drawing Sheet

(51) Int. Cl.
*C09J 7/26*        (2018.01)
*C09J 7/35*        (2018.01)

(52) U.S. Cl.
CPC .... *C09J 2301/124* (2020.08); *C09J 2301/204* (2020.08); *C09J 2301/412* (2020.08); *C09J 2401/006* (2013.01); *C09J 2463/00* (2013.01); *C09J 2467/006* (2013.01)

(56) References Cited

U.S. PATENT DOCUMENTS

2017/0080697 A1* 3/2017 Wada .................. B32B 27/304
2018/0134926 A1  5/2018 Lei

FOREIGN PATENT DOCUMENTS

| | | | |
|---|---|---|---|
| JP | 2013104044 A | | 5/2013 |
| WO | WO2005075189 | * | 8/2005 |
| WO | WO 2013-013128 | | 1/2013 |
| WO | WO 2016-163514 | | 10/2016 |

* cited by examiner

ADHESIVE SHEET

TECHNICAL FIELD

The present invention relates to an adhesive sheet, and more particularly a thermally expandable adhesive sheet.

BACKGROUND ART

Adhesive sheets have been used to adhere adherends to one another. An adhesive sheet is typically prepared in a state in which an adhesive is applied to both sides of a substrate and a liner is further attached to the surface of the adhesive. At the time of an actual operation, the operator peels off the liner and attaches the adhesive sheet to the surface of an adherend.

However, there are cases, for example, in which the structure of the adherend is so complex that the adherend cannot be simply laminated after an adhesive sheet is attached to the other adherend, and cases in which the gap between adherends is so narrow that an adhesive sheet cannot be disposed appropriately between the adherends. A known example of an adhesive sheet that can be used even in such situations is that described in Patent Document 1.

PRIOR ART DOCUMENTS

Patent Document 1—WO 2016/163514

Patent Document 1 describes an adhesive sheet with a thermally expandable adhesive layer formed on the surface of a substrate and a mold releasing agent layer further formed on the adhesive layer. Such an adhesive sheet has a mold releasing agent layer provided on the surface of the adhesive layer, and thus the adhesive sheet is "tack-free", meaning that it does not exhibit tackiness at room temperature, in a state prior to use. At the time of use, the adhesive sheet is disposed at a prescribed position and heated. Then the mold releasing agent layer is broken down and incorporated into the adhesive, and thus the adhesive, then, emerges on the surface.

SUMMARY OF THE INVENTION

Problem to be Solved by the Invention

The present invention provides a thermally expandable adhesive sheet which is tack-free in a state prior to use and exhibits high workability with a different solution methodology than in Patent Document 1.

Means for Solving the Problem

To solve the problem described above, the present invention provides a thermally expandable adhesive sheet including: a substrate; two thermally expandable adhesive layers each provided on either side of the substrate; and two adhesive permeable layers each provided on a surface of the two adhesive layers, the adhesive permeable layers being permeable to the adhesive at the time of thermal expansion of the adhesive.

With the present invention configured in such a manner, after the adhesive sheet is disposed between adherends, heating the adhesive sheet initiates thermal expansion of the adhesive constituting the adhesive layers of the adhesive sheet. When the adhesive thermally expands, the adhesive then permeates through the adhesive permeable layer provided on the surface of the adhesive layer and exudes to the outer surface of the adhesive permeable layer. This allows the adhesive to reach the outer surface of the adhesive permeable layer, which is the outermost layer prior to heating, and the adherends can be attached to one another. More specifically, prior to the heating of the adhesive sheet, that is, when the adhesive sheet is positioned with respect to an adherend, the adhesive permeable layer is disposed on the outermost layer of the adhesive sheet. Thus, the adhesive sheet can be prevented from unintentionally adhering to the adherend when the adhesive sheet is positioned with respect to the adherend, and workability can be enhanced. In addition, use of a thermally expandable adhesive as the adhesive forming the adhesive layers can reduce a thickness of the adhesive sheet smaller than a gap between adherends. Heating the adhesive sheet after positioning the adhesive sheet with respect to the adherends initiates thermal expansion of the adhesive constituting the adhesive layer. When the adhesive expands, the adhesive penetrates into the adhesive permeable layer and reaches the outer surface of the adhesive permeable layer. In addition, the overall thickness of the adhesive sheet increases due to the expansion of the adhesive, and thus the gap between the adherend can be filled by the adhesive sheet. Thus, heating the adhesive sheet of the present invention allows the adhesive sheet to expand while simultaneously allowing the adhesive to emerge on the outermost surface of the adhesive sheet.

In addition, in the present invention, the adhesive permeable layers are preferably formed from a material having a glass transition temperature that is higher than the curing starting temperature of the adhesive constituting the adhesive layers.

With the present invention configured in such a manner, the adhesive permeable layers can be prevented from being broken down after the adhesive expands and before the adhesive begins to cure.

In this case, the adhesive permeable layers are preferably non-woven fabrics or papers.

In addition, in the present invention, the adhesive constituting the adhesive layers is preferably an insulating adhesive.

With the present invention configured in such a manner, the adhesive sheet can be applied even in applications in which insulation is required between the adherends.

Effect of the Invention

As described above, the present invention can provide a thermally expandable adhesive sheet which is tack-free in the state prior to use and exhibits high workability with a different solution methodology than in Patent Document 1.

DESCRIPTION OF THE PREFERRED EMBODIMENTS

Embodiments of the present invention will be described in detail hereinafter. An example in which an adhesive sheet is applied to a motor will be given hereinafter. A stator body of a motor has a cylindrical shape and has a plurality of slots along the inner periphery of the cylinder. A coil for the motor is disposed in the slots. Typically, the stator body and the coil are adhered to one another and are electrically insulated from one another.

In a related art, an insulator was sandwiched between the stator body and the coil, and a liquid adhesive was allowed to penetrate the gap to adhere and fix each member. An adhesive sheet is disposed between the stator body of the motor and the coil, which are adherend members, and the two adherend members are bonded by the adhesive force of the adhesive sheet. A prescribed gap is provided between the adhesion surfaces of the two adherend members, and the adhesive sheet is disposed in this gap.

At the time of the attachment of the stator body and the coil, an adhesive sheet in a state before the adhesive sheet exhibits an adhesive force, that is, a tack-free state, is first disposed between the adhesion surfaces of the adherend members. At this time, the gap between the adherend members is preferably slightly greater than the thickness of the adhesive sheet. After the adhesive sheet is disposed at a prescribed position, the adhesive sheet is heated. Thus, the adhesive sheet transitions from the tack-free state to a state in which the adhesive sheet has an adhesive force on the surface.

Figure 1:
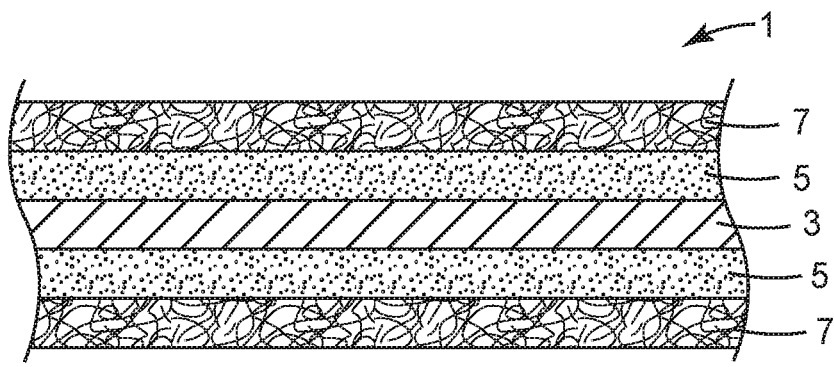
FIG. 1 is a cross-sectional view illustrating the configuration of an adhesive sheet according to an embodiment of the present invention.

FIG. 1 is a cross-sectional view illustrating the configuration of the adhesive sheet. More specifically, FIG. 1 is a cross-sectional view of an adhesive sheet before the adhesive sheet exhibits an adhesive force, that is, in a tack-free state. As illustrated in FIG. 1, the adhesive sheet 1 in a tack-free state includes a plate-like substrate 3, adhesive layers 5 provided on both main surfaces of the substrate 3, and adhesive permeable layers 7 provided on the surfaces of the two adhesive layers 5. In the tack-free state, the adhesive layers 5 are sandwiched between the substrate 3 and the adhesive permeable layers 7, such that the adhesive is not present on the outer surface of the adhesive sheet 1.

The substrate 3 is both a portion serving as a base for forming the adhesive layers 5 and a member that essentially defines the size of the adhesive surface of the adhesive sheet 1. Exemplary substrates should be heat resistant film materials. Exemplary substrates include polyaramide film, polycarbonate film, polyimide (PI) film, polyester (PET) films, polyethylene naphthalate (PEN) film, polyetheretherketone (PEEK) film, nylon, or PEN/polymethylmethacrylate multilayer films. Taking strength, heat resistance, and the like into consideration, a polyethylene naphthalate (PEN) film, for example, is preferably used as the substrate 3. However, it is sufficient for the substrate to function as a base for forming the adhesive layers 5 in the production stage of the adhesive sheet 1, and thus any material may be used as long as the material has strength sufficient to support the adhesive layers 5 and does not diminish the adhesive strength of the adhesive constituting the adhesive layers 5 at the time of heating. The thickness of the substrate 3 may be adjusted, taking the gap between the adherends into consideration. That is, in addition to a function of adhering the stator body and the coil of the motor as adherends, the adhesive sheet 1 also has a function of filling the gap between the adherend members. Therefore, in a case where the gap is large, the thickness of the substrate 3 can be increased to suitably fill the gap.

The adhesive layers 5 are layers of a thermally expandable adhesive formed on the main surfaces of both sides of the substrate 3. As the adhesive constituting the adhesive layers 5, an adhesive which is practically in a solid state at room temperature, becomes fluid when heated, expands in volume when heating is continued, and cures when cooled can be used. A thermosetting epoxy resin can be used as such an adhesive. Examples of resins that can be used as thermosetting epoxy resins include but are not limited to bisphenol epoxy resins such as bisphenol A epoxy resins and bisphenol F epoxy resins, epoxy resins having an aliphatic skeleton such as hexanediol diglycidyl ether, glycidyl amine epoxy resins such as triglycidyl amino phenol, novolac epoxy resins such as phenol novolac epoxy resins and cresol novolac epoxy resins, brominated epoxy resins, alicyclic epoxy resins, and mixtures thereof. The thermosetting epoxy resin may further contain a phenoxy resin (polyhydroxy polyether synthesized from bisphenols and epichlorohydrin) as a thermoplastic component.

The expandable adhesive also includes an expansion agent in the form of a microcapsule. Exemplary microcapsules comprise an low boiling liquid hydrocarbon entrapped in a polymer shell. One exemplary microcapsule is available under the tradename Matsumoto Microsphere® FN 100-D available from Matsumoto Yushi-Seiyaku Co., Ltd. (Japan).

The expandable adhesive provided above may further include crosslinking agents, a curing agent, impact modifiers, inorganic filler particles, coupling agents, etc. commonly employer in the epoxy adhesive art.

Upon expansion of the adhesive constituting the adhesive layers 5, the adhesive permeable layers 7 allow the adhesive to permeate from one main surface side of the adhesive permeable layers 7 to the other main surface side. More specifically, the adhesive permeable layer 7 has a structure including at least a plurality of holes passing through from one main surface to the other main surface. Providing the adhesive permeable layers 7 with a structure including a plurality of holes allows the adhesive to pass through the holes to reach the other main surface of the adhesive permeable layers 7 at the time of the expansion of the adhesive, which is only in contact with one of the main surfaces of the adhesive permeable layers 7 prior to heating. In addition, a material having a glass transition temperature that is higher than the curing starting temperature of the thermally expandable adhesive constituting the adhesive layers 5 is selected as the material constituting the adhesive permeable layers 7. Specifically, a non-woven fabric or papers based on natural fibers, chemical fibers, or a mixture thereof can be used as the material used as the adhesive permeable layers 7. For example, a cellulose-based non-woven paper can be used adhesive permeable layers 7. Exemplary nonwoven fabrics can include nonwoven glass fabrics, aramid-based nonwoven fabrics, a polyolefin-based nonwoven fabric, a polysulfone-based nonwoven fabrics, polyaramide nonwoven fabrics, polyphenylsulfide-based nonwoven fabrics, polyester-based nonwoven fabrics, nylon-based nonwoven fabrics or liquid crystal polymer (LCP)-based nonwoven fabrics. Such a non-woven fabrics/papers have multiple through-holes inside, and thus an adhesive in contact with one of the main surfaces can pass through the inside of the non-woven fabrics/papers and reach the other main surface under certain conditions.

The basis weight of the non-woven fabric or paper is at least 10 g/m$^2$ and preferably not less than 11 g/m$^2$. Experiments indicated that lower basis weight non-woven fabrics and papers failed to provide sufficient adhesive strength after curing of the adhesive. In addition, the thickness of the non-woven fabrics/papers is not greater than 50 μm and preferably not greater than 47 This is because the results of experiments indicated that too large a thickness of the non-woven material reduces the amount of adhesive exuding to the surface of the non-woven when the adhesive sheet is heated and reduces the shearing adhesive strength of the adhesive sheet 1.

When the adhesive sheet 1 is used, the adhesive sheet 1 in a tack-free state is disposed between the adhesion surfaces of the members disposed with a prescribed gap therebetween. The adhesive sheet 1 is in a tack-free state at this time, and the adhesive sheet 1 can be prevented from unintentionally adhering to the members. Also, the adhesive sheet 1 can be disposed easily even if the gap between the adherends is relatively narrow. After the adhesive sheet 1 is disposed at a fixed position between the adherends, the adhesive sheet 1 is heated and the adhesive sheet 1 transitions from the tack-free state to a state in which the adhesive sheet 1 has an adhesive force on the surface.

Figure 2:
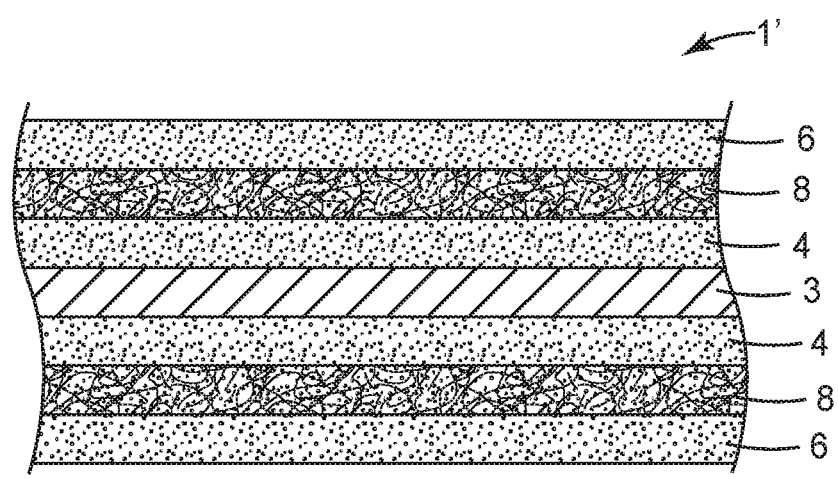
FIG. 2 is a cross-sectional view illustrating the configuration of the adhesive sheet.

FIG. 2 is a cross-sectional view illustrating the configuration of the adhesive sheet. More specifically, FIG. 2 is a cross-sectional view of an adhesive sheet in a state in which the adhesive sheet exhibits an adhesive force.

In the state illustrated in FIG. 2, the layer structure of the adhesive sheet 1' differs from the layer structure of the adhesive sheet 1 in the tack-free state shown in FIG. 1. In the state illustrated in FIG. 2, in contrast to the state illustrated in FIG. 1, the adhesive permeable layer 8 is embedded inside the adhesive layer 4, 6 provided on both main surfaces of the substrate 3. Thus, both sides of the adhesive sheet 1 have an adhesive force. Upon heating the adhesive sheet 1 in a tack-free state (FIG. 1), the adhesive constituting the adhesive layers 5 expands through the adhesive permeable layer such that the adhesive impregnated the adhesive permeable layer 8 as shown in FIG. 2. As a result, the adhesive permeable layer on the surface of the adhesive layer is first pressed against the adhesion surface of the adherend member. Due to the further expansion of the adhesive, the adhesive then penetrates into the adhesive permeable layer 8 and exudes to the outer surface of the adhesive permeable layer to yield an adhesive layer 6. The phenomenon in which the adhesive exudes to the outer surface of the adhesive permeable layer occurs individually on each of the main surfaces of the adhesive sheet 1'. Accordingly, upon heating the adhesive sheet in a tack-free state illustrated in FIG. 2, the adhesive on the upper side of the substrate passes through the adhesive permeable layer on the upper side of the substrate and emerges on the surface on the upper side of the adhesive sheet, while the adhesive on the lower side of the substrate passes through the adhesive permeable layer on the lower side of the substrate and emerges on the surface on the lower side of the adhesive sheet. Thus, the adhesive 6 is interposed between the adhesive permeable layer 8 and the adhesion surface of the adherend member, and the adhesive permeable layer 8 is essentially embedded inside the expanded adhesive layers. Further, in the state illustrated in FIG. 2, the adhesive 6 is present on the outermost surface of the adhesive sheet 1', thus the adhesive sheet 1' assumes a state exhibiting an adhesive force. By curing the adhesive, the adherend members can be adhered to one another by the adhesive sheet 1'. In addition, upon heating the adhesive sheet 1 to expand the adhesive, the adhesive permeable layer is embedded inside the adhesive layers 4, 6 and remains inside the adhesive layers. And thus, the adhesive permeable layer functions as a member configured to suppress the expansion of the adhesive in the plane direction.

In such a manner, the adhesive sheet 1 undergoes a transition from a tack-free state to a state where the adhesive sheet 1' has an adhesive force on both sides. Such a transition allows the adhesive sheet 1 be easily disposed at a prescribed position. In addition, by expanding the adhesive sheet to be adaptable with the surface shape of the adhesion surface, the gap between the adherend members can be filled, and even if a processing error is present on the adhesion surfaces, the adherend members can be suitably adhered to one another regardless of the error.

Further, the adhesive sheet 1 can also be used in a state in which it is folded in accordance with the shape of the gap between the adherend members.

Next, an example of the present invention will be described in detail.

Substrate

A PEN film (trade name: Teonex Q51, manufactured by Teijin Film Solutions Limited) with a thickness of 75 μm was prepared as a substrate.

Thermally Expandable Adhesive

The thermally expandable adhesive formulation was optimized to find to optimal cure conditions. The expansion agent (FN-100SD) was not included in this study, since it could interfere with the cure kinetics (because of expansion) of this controlled experiment. The curing agent was varied from 2 parts to 6 parts and the accelerator was varied from 0.2 to 2 parts. The detailed formulation information for these precursor adhesives is provided in Table 1A. Methyl Ethyl Ketone (MEK) was used as a solvent to aid in the in mixing of the components. The mixing was done in a speed mixer at a speed of 2000 rpm for 3-5 minutes. After mixing was completed, the solvent was removed in a vacuum oven at 60° C. Note the formulation information in Table 1A is provided on a dry weight percent basis (i.e. after the solvent was removed).

A 20 mg sample of each formulation was cured in a DSC (Differential Scanning calorimeter) at a scan rate of 10° C./min. The peak curing temperature and the heat of reaction were recorded from the curing exotherm. The peak curing temperature and heat of reaction data show dependence on curing agent and accelerator ratios. The preferable condition is high heat of reaction which relates to completion of reaction and a high crosslink density.

TABLE 1A

| Trade name | Adhesive A | Adhesive B | Adhesive C | Adhesive D | Adhesive E |
|---|---|---|---|---|---|
| EPICLON N-740 | 23.70 | 22.11 | 22.58 | 23.18 | 22.87 |
| Tactix 742 | 54.47 | 50.81 | 51.89 | 53.28 | 52.57 |
| YSLV-80XY | 0.74 | 0.69 | 0.71 | 0.73 | 0.72 |
| YP-50EK35 | 7.82 | 7.29 | 7.45 | 7.65 | 7.54 |
| Paraloid BTA-731 | 5.58 | 5.21 | 5.32 | 5.46 | 5.39 |
| Ajicure PN-50 | 0.25 | 2.31 | 0.24 | 2.43 | 1.32 |
| Amicure CG-1200G | 2.48 | 6.94 | 7.09 | 2.43 | 4.79 |
| CAB-O-SIL TS-720 | 4.47 | 4.17 | 4.26 | 4.37 | 4.31 |
| XIAMETER OFS-6040 Silane | 0.5 | 0.46 | 0.47 | 0.49 | 0.48 |

TABLE 1A-continued

| Trade name | Adhesive A | Adhesive B | Adhesive C | Adhesive D | Adhesive E |
|---|---|---|---|---|---|
| Peak Cure Temperature (° C.) | 170 | 147 | 174 | 138 | 151 |
| Heat of Reaction | 120 | 128 | 381 | 139 | 315 |

The results suggest that Adhesive formulation E with a concentration of 1.32 wt. % PN-50 and 4.79 wt. % of Dicyanex provided the best results of a desirable cure temperature of 150° C. and a high heat of reaction, which relates directly to the completion of the curing reaction and high crosslink density. About 150° C. curing temperature is preferred because the expansion of the adhesive occurs around 115-120° C. and the curing should take place immediately after expansion to stabilize the expansion.

The materials listed in Table 1B below were prepared as a thermally expandable adhesive. Note that the composition of the expandable adhesive formulation is provided prior to removal (drying) of the solvent.

TABLE 1B

| Trade name | Chemical name | Source | Wt. % |
|---|---|---|---|
| EPICLON N-740 | Phenol novolac epoxy resin | DIC Corporation | 12% |
| Tactix 742 | Trifunctional epoxy resin | Huntsman Japan Corporation | 28% |
| YSLV-80XY | Crystalline epoxy resin | Nippon Steel & Sumikin Chemical Co., Ltd. | 0% |
| YP-50EK35 | Phenoxy resin MEK solution | Nippon Steel & Sumikin Chemical Co., Ltd. | 11% |
| Paraloid BTA-731 | Core-shell impact modifier | Dow Chemical Company | 3% |
| Matumoto Microshere FN-100SD | Expandable particles | Matsumoto Yushi-Seiyaku Co., Ltd. | 9% |
| Ajicure PN-50 | Amine adduct promoter | Ajinomoto Fine-Techno Co., Ltd. | 1% |
| Amicure CG-1200G | Dicyandiamide | Evonik Japan | 5% |
| CAB-O-SIL TS-720 | Fumed silica | Cabot Corporation | 2% |
| XIAMETER OFS-6040 Silane | Silane compound | Dow Corning Toray Co., Ltd. | 0% |
| Methylethylketone | Methyl ethyl ketone | Fuji Film Wako Chemical Industries, Ltd. | 29% |

After the materials described above were prepared, the resins EPICLON N-740, Tactix 742, and YSLV-80XY were dissolved in YP-50EK35. Next, the other materials were dispersed in the solution in which the resins were dissolved and mixed with a mixer to prepare a thermally expandable adhesive. The amounts of each of the materials were as listed in Table 1B.

Adhesive Permeable Layer

A non-woven fabrics/papers described in Table 2 below was prepared as an adhesive permeable layer.

TABLE 2

| Sample number | Sample name | Source | Materials | Basis weight (g/m²) | Thickness (μm) |
|---|---|---|---|---|---|
| NW1 | Wood pulp: 14 g | Nippon Paper Papylia Co., Ltd. | Wood pulp | 14 | 32.5 |
| NW2 | Wood and hemp pulp: 16 g | Nippon Paper Papylia Co., Ltd. | Wood pulp and help pulp | 16.5 | 32 |
| NW3 | Wood and hemp pulp: 30 g | Nippon Paper Papylia Co., Ltd. | Wood pulp and help pulp | 29 | 47 |
| NW4 | Rayon: 14 g | Nippon Paper Papylia Co., Ltd. | Rayon and pulp | 14 | 36.5 |
| NW5 | Heat-insulated thin paper D-30 | Daio Paper Corporation | Pulp | 20 | 33 |
| NW6 | Rayon PM: 14 g | Daio Paper Corporation | Rayon | 14 | 30 |
| NW7 | Rayon paper M: 14 g | Daio Paper Corporation | Rayon | 14 | 41 |
| NW8 | Rayon paper M: 17 g | Daio Paper Corporation | Rayon | 17 | 40 |
| NW9 | Rayon paper M: 20 g | Daio Paper Corporation | Rayon | 20 | 47 |
| NW10 | Rayon paper M: 30 g | Daio Paper Corporation | Rayon | 30 | 57 |
| NW11 | Rayon paper L: 11 g | Daio Paper Corporation | Rayon | 11 | 32 |
| INW12 | Rayon paper L: 14 g | Daio Paper Corporation | Rayon | 14 | 38.5 |
| NW13 | Rayon paper L: 17 g | Daio Paper Corporation | Rayon | 17 | 40 |
| NW14 | Rayon paper L: 30 g | Daio Paper Corporation | Rayon | 30 | 60 |
| NW15 | Rayon paper PM: 14 g | Daio Paper Corporation | Rayon | 14 | 29.5 |
| NW16 | Rayon paper PM: 17 g | Daio Paper Corporation | Rayon | 17 | 35.5 |

TABLE 2-continued

| Sample number | Sample name | Source | Materials | Basis weight (g/m$^2$) | Thickness (µm) |
|---|---|---|---|---|---|
| NW17 | Rayon paper PM: 20 g | Daio Paper Corporation | Rayon | 20 | 39.5 |
| NW18 | Rayon paper PM: 30 g | Daio Paper Corporation | Rayon | 30 | 56 |
| NW19 | Unbleached rayon paper | Daio Paper Corporation | Unbleached rayon and pulp | 17 | 32 |
| NW20 | Transparent rayon paper | Daio Paper Corporation | Rayon | 9 | 32.5 |
| NW21 | Oil absorbent paper SD | Daio Paper Corporation | Wood pulp | 16 | 23 |
| NW22 | Thin paper | Daio Paper Corporation | Pulp | 23 | 42.5 |
| NW23 | Rayon paper (thin) | Daio Paper Corporation | Rayon | 6 | 21.5 |
| NW24 | Craft paper | Daio Paper Corporation | Craft | 30 | 50 |
| INW26 | Vecrus LCP nonwoven 11F | KurarayKuraflex Co. Ltd. | Liquid Crystal Polymer | 11 | 33 |
| NW27 | Vecrus LCP nonwoven 14F | KurarayKuraflex Co. Ltd. | Liquid Crystal Polymer | 14 | 38 |
| NW28 | Vecrus LCP nonwoven 24C | KurarayKuraflex Co. Ltd. | Liquid Crystal Polymer | 25 | 40 |

Adhesive Sheet

The thermally expandable adhesive was applied to both sides of the prepared substrate. The amount of the applied adhesive was 39 g/m$^2$. The substrate was then dried for 3 minutes at 65° C. and further dried for 3 more minutes at 100° C. to remove the solvent, methyl ethyl ketone. The adhesive coated substrates to which such an adhesive was applied were prepared. The samples NW1 to NW28 listed in Table 2 were respectively attached to the substrates to prepare samples SMPL1 to SMPL28 for testing. Note that SMPL25 was prepared without attaching a non-woven fabric to the adhesive layers of the remaining substrate for comparison.

Blocking Test

For the prepared samples SMPL1 to SMPL28, a blocking test was performed in accordance with the following procedure.

Sample size: 25 mm×25 mm

Two samples of the same compositions were layered, and after the two samples were further sandwiched between SUS304 plates (100 mm×50 mm; thickness: 1 mm; weight: 40 g), a 500 g weight was placed thereon.

The samples were left for 4.5 days in an oven set to 40° C.

The samples were retrieved from the oven and after the weight was removed, the to samples were left to stand for one hour or longer at room temperature.

The SUS304 plates were removed, and after the samples of two layers were carefully peeled, the attachment state was observed.

The attachment state was observed and evaluated in accordance with the following criteria.

Evaluation 1: Attachment between sample surfaces
Evaluation 2: Moderate attachment to sample surface
Evaluation 3: Mild attachment to end face portion of sample
Evaluation 4: Slight attachment to end face portion of sample
Evaluation 5: No attachment whatsoever Overlap Shear Adhesion Test A overlap shear adhesion test of shearing adhesive strength test was performed in accordance with the following procedure for the prepared samples SMPL1 to SMPL28.

Sample size: 12.5 mm×25 mm

Two cold rolled steel (CRC) substrates that were surface-washed with MEK were prepared, and after a sample in a tack-free state and a spacer with a thickness of 0.4 mm were placed on one of the CRC substrates, the other CRC substrate was placed on the sample and the spacer.

The spacing between the two substrates was fixed using a clamp.

The sample was left for 30 minutes in an oven set to 180° C. to heat the sample.

The clamp was removed, and a shearing adhesive strength test was performed at a shearing tension speed of 5 mm/min.

The overlap shear strength of sample SMPL25 to which a non-woven fabric was not attached was defined as 100%, and the residual ratio of the adhesive with respect to SMPL25 was calculated for SMPL1 to SMPL28.

The results of blocking tests and shearing adhesive strength tests are shown in Table 3 below.

TABLE 3

| Sample number | Basis weight (g/m$^2$) | Thickness (µm) | Basis weight/ Thickness | Blocking test evaluation | Overlap Shear Strength (MPa) | Residual ratio (%) |
|---|---|---|---|---|---|---|
| SMPL1 | 14 | 32.5 | 0.43 | 5 | 4.34 | 83 |
| SMPL2 | 16.5 | 32 | 0.52 | 4 | 3.6 | 69 |
| SMPL3 | 29 | 47 | 0.62 | 5 | 2.405 | 46 |
| SMPL4 | 14 | 36.5 | 0.38 | 4 | 4.225 | 81 |
| SMPL5 | 20 | 33 | 0.61 | 5 | 4.64 | 88 |
| SMPL6 | 14 | 30 | 0.47 | 4 | 4.345 | 83 |
| SMPL7 | 14 | 41 | 0.34 | 4 | 3.88 | 74 |
| SMPL8 | 17 | 40 | 0.43 | 4 | 4.66 | 89 |
| SMPL9 | 20 | 47 | 0.43 | 5 | 3.155 | 60 |
| SMPL10 | 30 | 57 | 0.53 | 5 | 1.865 | 36 |
| SMPL11 | 11 | 32 | 0.34 | 3 | 4.48 | 85 |
| SMPL12 | 14 | 38.5 | 0.36 | 3 | 4.57 | 87 |
| SMPL13 | 17 | 40 | 0.43 | 3 | 4.1 | 78 |
| SMPL14 | 30 | 60 | 0.50 | 5 | 0.685 | 13 |
| SMPL15 | 14 | 29.5 | 0.47 | 3 | 4.285 | 82 |
| SMPL16 | 17 | 35.5 | 0.48 | 4 | 4.385 | 84 |

TABLE 3-continued

| Sample number | Basis weight (g/m²) | Thickness (μm) | Basis weight/ Thickness | Blocking test evaluation | Overlap Shear Strength (MPa) | Residual ratio (%) |
|---|---|---|---|---|---|---|
| SMPL17 | 20 | 39.5 | 0.51 | 5 | 4.63 | 88 |
| SMPL18 | 30 | 56 | 0.54 | 5 | 0.25 | 5 |
| SMPL19 | 17 | 32 | 0.53 | 5 | 4.535 | 86 |
| SMPL20 | 9 | 32.5 | 0.28 | 2 | 4.24 | 81 |
| SMPL21 | 16 | 23 | 0.70 | 3 | 4.445 | 85 |
| SMPL22 | 23 | 42.5 | 0.54 | 5 | 3.535 | 67 |
| SMPL23 | 6 | 21.5 | 0.28 | 1 | 4.48 | 85 |
| SMPL24 | 30 | 50 | 0.60 | 5 | 0 | 0 |
| SMPL25 | NA | NA | NA | NA | 5.245 | 100 |
| SMPL26 | 11 | 33 | 0.33 | 4 | 3.7 | 71 |
| SMPL27 | 14 | 28 | 0.36 | 4 | 2.6 | 50 |
| SMPL28 | 25 | 40 | 0.82 | 5 | 3.5 | 67 |

SMPL14, SMPL18, and SMPL24 are non-working examples because of the insufficient overlap shear strengths due to too much interruption of the adhesive before its curing (during heating) by the adhesive penetration layer. The higher interruption comes from the combination of the relatively density of the adhesive penetration layer (referred to as "Basis weight/Thickness" as calculated values in the table above for the sake of practical convenience) and the higher thickness of the adhesive penetration layer.

SMPL20 and SMPL23 are also non-working examples because of the failures in the blocking test (scores 1 and 2) due to the too low interruption of the adhesive by the adhesive penetration layer in the test condition (40° C. for 4.5 days), which indicates that the "blocking problem" could occur in the roll state of the product (hence the roll could not be rewound and used) in a prolonged storage at room temperature.

What is claimed is:

1. An adhesive sheet comprising:
   a substrate;
   two thermally expandable adhesive layers each provided on either side of the substrate; and
   two adhesive permeable layers each provided on a surface of the two thermally expandable adhesive layers, the adhesive permeable layers being permeable to the adhesive at the time of thermal expansion of the adhesive,
   wherein the adhesive permeable layers are non-woven fabrics, and
   wherein a basis weight of the nonwoven fabric is from 10 to 30 g/m² and wherein a thickness of the non-woven fabrics is not greater than 50 μm, and wherein the adhesive sheet is tack-free prior to the time of thermal expansion of the adhesive.

2. The adhesive sheet according to claim 1, wherein the adhesive permeable layers are formed from a material having a glass transition temperature higher than a curing starting temperature of the adhesive constituting the adhesive layers.

3. A thermally expandable sheet comprising:
   a substrate;
   two thermally expandable adhesive layers each provided on either side of the substrate; and
   two adhesive permeable layers each provided on a surface of the two thermally expandable adhesive layers, the adhesive permeable layers being permeable to the adhesive at the time of thermal expansion of the adhesive,
   wherein the adhesive permeable layers are non-woven papers, wherein a basis weight of the non-woven paper is from about 10 to 30 g/m2, and wherein a thickness of the non-woven paper is not greater than 50 μm, and wherein the adhesive sheet is tack-free prior to the time of thermal expansion of the adhesive.

4. The adhesive sheet according claim 1, wherein the adhesive constituting the adhesive layers is an insulating adhesive.

5. The adhesive sheet according to claim 1, wherein the substrate comprises one of a polyethylene naphthalate film, polyester film, a polycarbonate film, a polyimide film, a nylon film a polyaramid film and a polyethylene naphthalate/polymethyl methacrylate multilayer film.

6. The adhesive sheet according to claim 1, wherein the substrate comprises a polyethylene naphthalate film.

7. The adhesive sheet according to claim 1, wherein the adhesive permeable layers comprise a material selected from the group consisting of a liquid crystal polymer nonwoven fabric, a nylon nonwoven fabric a polyolefin nonwoven fabric, an acrylic nonwoven fabric, a polyester nonwoven fabric, and a polyphenyl sulfide nonwoven fabric.

8. The adhesive sheet according to claim 1, wherein the adhesive permeable layers comprise a liquid crystal polymer nonwoven fabric.

9. The adhesive sheet according to claim 3, wherein the adhesive permeable layers comprise a cellulose based nonwoven paper.

10. The adhesive sheet according to claim 1, wherein the expandable adhesive layers comprise a thermosetting epoxy resin and an expandable microcapsule.

11. The adhesive sheet according to claim 3, wherein the adhesive permeable layers are formed from a material having a glass transition temperature higher than a curing starting temperature of the adhesive constituting the adhesive layers.

12. The adhesive sheet according to claim 3, wherein the adhesive constituting the adhesive layers is an insulating adhesive.

13. The adhesive sheet according to claim 3, wherein the substrate comprises one of a polyethylene naphthalate film, polyester film, a polycarbonate film, a polyimide film, a nylon film a polyaramid film and a polyethylene naphthalate/polymethyl methacrylate multilayer film.

14. The adhesive sheet according to claim 3, wherein the substrate comprises a polyethylene naphthalate film.

15. The adhesive sheet according claim 3, wherein the thermally expandable adhesive layers comprise a thermosetting epoxy resin and an expandable microcapsule.

* * * * *